US011712811B2

(12) United States Patent
Ishida et al.

(10) Patent No.: US 11,712,811 B2
(45) Date of Patent: *Aug. 1, 2023

(54) GRIPPING TOOL AND GRIPPING SYSTEM

(71) Applicant: KABUSHIKI KAISHA TOSHIBA, Tokyo (JP)

(72) Inventors: Emiko Ishida, Yokohama (JP); Noriyuki Ooba, Yokohama (JP); Hiromasa Takahashi, Minato-ku (JP); Akira Ushijima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 17/153,217

(22) Filed: Jan. 20, 2021

(65) Prior Publication Data

US 2021/0237283 A1 Aug. 5, 2021

Related U.S. Application Data

(60) Division of application No. 16/360,893, filed on Mar. 21, 2019, now Pat. No. 10,926,419, which is a (Continued)

(30) Foreign Application Priority Data

Nov. 9, 2016 (JP) .................................. 2016-218855

(51) Int. Cl.
*B25J 15/06* (2006.01)
*B25J 15/12* (2006.01)
(Continued)

(52) U.S. Cl.
CPC ........... *B25J 15/0683* (2013.01); *B25J 15/06* (2013.01); *B25J 15/08* (2013.01); *B25J 15/12* (2013.01); *B25J 15/0023* (2013.01)

(58) Field of Classification Search
CPC ........ B25J 15/0683; B25J 15/06; B25J 15/08; B25J 15/12; B25J 15/0023; B25J 15/00; B65G 47/90
See application file for complete search history.

(56) References Cited

U.S. PATENT DOCUMENTS 4,294,424 A 10/1981 Teissier
4,561,686 A 12/1985 Atchley
(Continued)

FOREIGN PATENT DOCUMENTS

CN 203665546 U 6/2014
JP 2008-528408 7/2008
(Continued)

OTHER PUBLICATIONS

International Search Report dated Dec. 12, 2017 in PCT/JP2017/034745, filed on Sep. 26, 2017 (with English Translation).
(Continued)

*Primary Examiner* — Stephen A Vu
(74) *Attorney, Agent, or Firm* — Oblon, McClelland, Maier & Neustadt, L.L.P.

(57) ABSTRACT

According to one embodiment, a gripping tool includes a gripper. The gripper is flexible. A granular material is provided in an interior of the gripper. The gripper is configured to grip a workpiece by being in close contact with the workpiece in a state in which an outer perimeter of the gripper is held, and by the interior of the gripper being depressurized.

19 Claims, 13 Drawing Sheets

Related U.S. Application Data continuation of application No. PCT/JP2017/034745, filed on Sep. 26, 2017.

(51) Int. Cl.
*B25J 15/08* (2006.01)
*B25J 15/00* (2006.01)

(56) References Cited

U.S. PATENT DOCUMENTS

| | | |
|---|---|---|
| 6,846,029 B1 | 1/2005 | Ragner |
| 8,882,165 B2 | 11/2014 | Lipson |
| 10,926,419 B2 * | 2/2021 | Ishida ................. B25J 15/0683 |
| 2009/0242719 A1 | 10/2009 | Carnevali |
| 2010/0054903 A1 | 3/2010 | Jones et al. |
| 2020/0054903 A1 | 2/2020 | Fair |

FOREIGN PATENT DOCUMENTS

| | | |
|---|---|---|
| JP | 2011-183536 | 9/2011 |
| JP | 2012-86340 A | 5/2012 |
| JP | 2012-176476 | 9/2012 |
| JP | 2012-236239 A | 12/2012 |
| JP | 2012-236289 A | 12/2012 |
| JP | 2016-112664 A | 6/2016 |
| JP | 2017-185553 A | 10/2017 |
| WO | WO 2015/006613 A1 | 1/2015 |

OTHER PUBLICATIONS

Written Opinion dated Dec. 12, 2017 in PCT/JP2017/034745, filed on Sep. 26, 2017.

\* cited by examiner

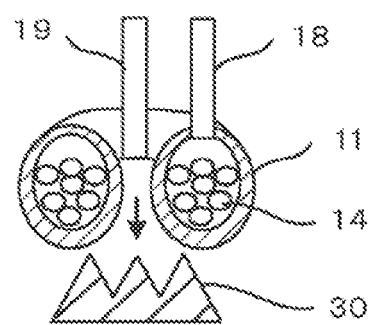
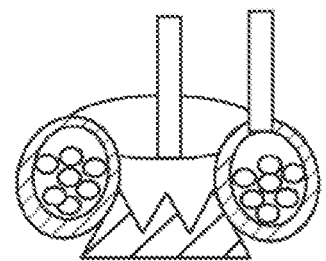
FIG. 3A    FIG. 3B
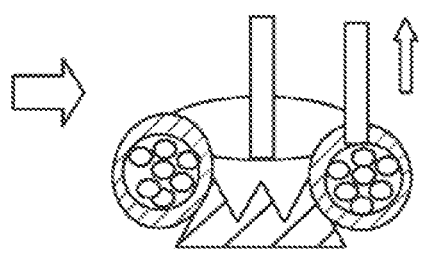
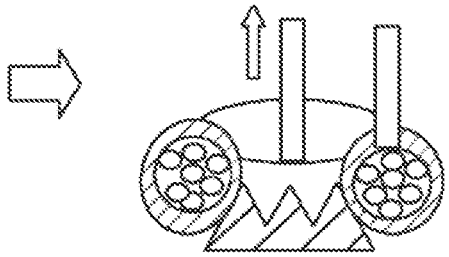
FIG. 3C    FIG. 3D
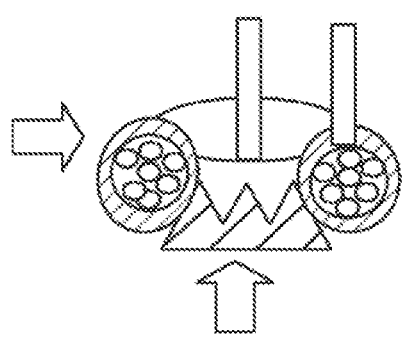
FIG. 3E

GRIPPING TOOL AND GRIPPING SYSTEM

CROSS-REFERENCE TO RELATED APPLICATIONS

This is a divisional application of U.S. application Ser. No. 16/360,893, filed Mar. 21, 2019, which is a continuation application of International Application PCT/JP2017/034745, filed on Sep. 26, 2017. This application also claims priority to Japanese Application No. 2016-218855, filed on Nov. 9, 2016. The entire contents are incorporated herein by reference.

FIELD

Embodiments described herein relate generally to a gripping tool and a gripping system.

BACKGROUND

A transfer robot includes an arm. A gripping tool for gripping a workpiece is mounted to the tip of the arm. The transfer robot uses the gripping tool to grip the workpiece at a pickup position. The transfer robot transfers the gripped workpiece to a prescribed position.

Various methods such as chucking, suction, supporting, a mufti-finger technique, jamming, etc., are known as methods for gripping the workpiece. Jamming can grip workpieces of various configurations.

In jamming, the workpiece is gripped by the following method. First, a flexible airtight bag into which a granular material is introduced is caused to be in close contact with the workpiece. The configuration of the airtight bag conforms to the configuration of the workpiece. The airtight bag interior is depressurized. The granular material is solidified and grips the workpiece.

A jamming gripping tool includes, for example, a fixing member and a hollow bag. The fixing member is provided at one end of the gripping tool and has a pressure supporting surface. The hollow bag is mounted to be in close contact with the pressure supporting surface. The granular material is filled into the hollow bag. However, it is problematic in that a gripping force sufficient to hold the workpiece is not obtained.

BRIEF DESCRIPTION OF THE DRAWINGS

FIGS. 3A to 3E are cross-sectional views showing an operation of the gripping tool according to the first embodiment in order;

DETAILED DESCRIPTION

According to one embodiment, a gripping tool includes a gripper. The gripper is flexible. A granular material is provided in an interior of the gripper. The gripper is configured to grip a workpiece by being in close contact with the workpiece in a state in which an outer perimeter of the gripper is held, and by the interior of the gripper being depressurized.

Various embodiments are described below with reference to the accompanying drawings.

First Embodiment

Figure 1:
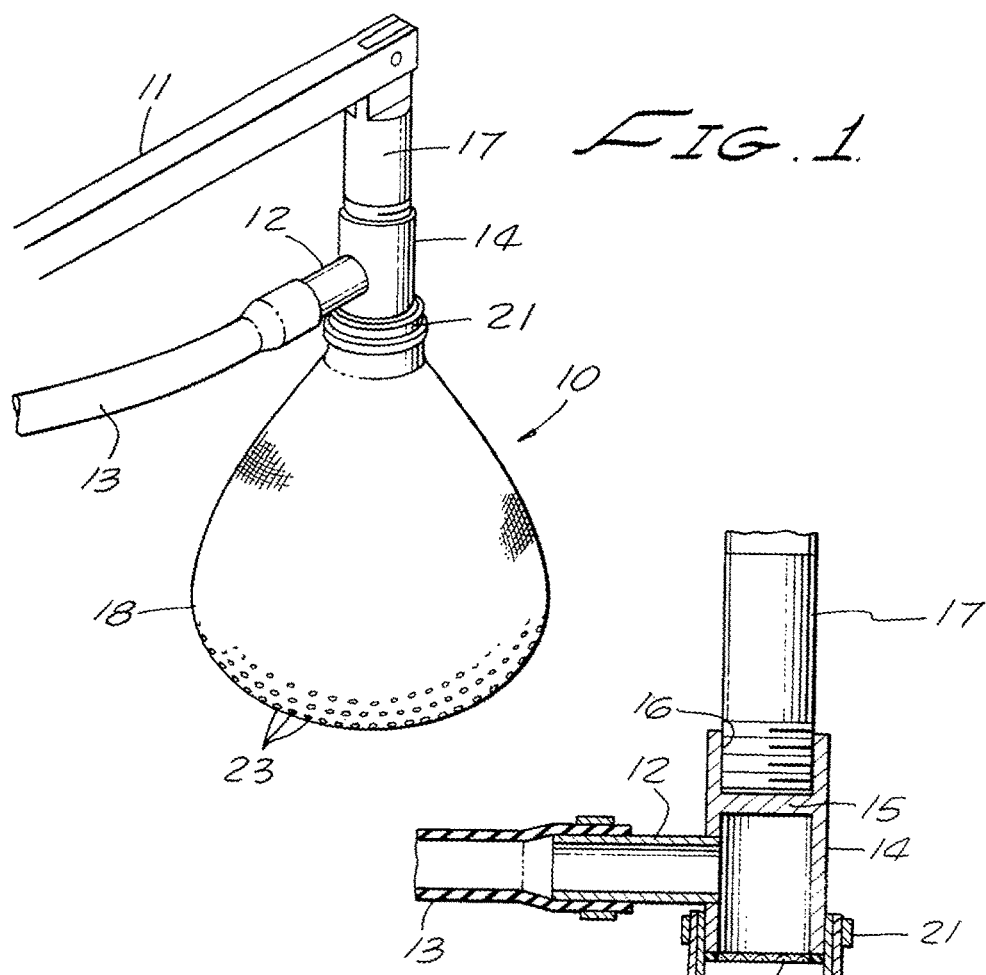
FIG. 1 is a cross-sectional perspective view showing a gripping tool according to a first embodiment.
Figure 2:
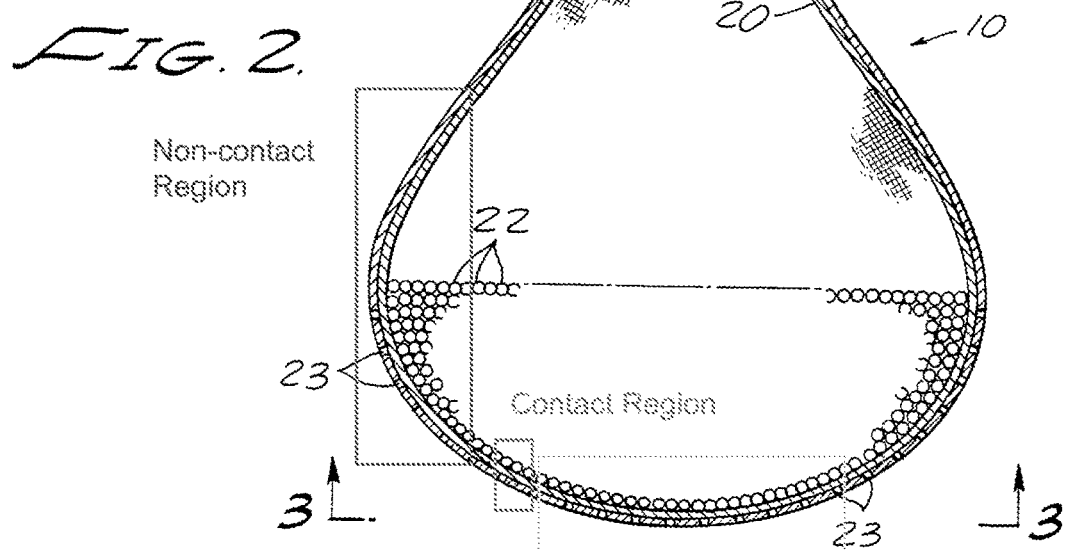
FIG. 2 is a perspective view showing the gripping tool according to the first embodiment.

A gripping tool according to the embodiment will now be described using FIG. 1 to FIG. 3E. FIG. 1 is a cross-sectional perspective view showing the gripping tool. FIG. 2 is a perspective view showing the gripping tool. FIGS. 3A to 3E are cross-sectional views showing an operation of the gripping tool in order. The embodiment is merely an illustration; and the invention is not limited thereto.

First, an overview of the gripping tool will be described.

As shown in FIG. 1 and FIG. 2, the gripping tool 10 includes a gripper 11 and a fixing portion 12. The gripper 11 grips a workpiece (not illustrated). The fixing portion 12 holds the gripper 11. The gripper 11 has a thickness. The interior of the gripper 11 is hollow. A first space exists in the interior of the gripper 11. A concave portion is formed at the central portion of the gripper 11. In the embodiment, for example, the gripper 11 is toroidal (a toroidal configuration). A toroidal first space is formed. The concave portion is provided at the center of the gripper 11. For example, a through-hole is formed in this portion. The fixing portion 12 is, for example, a ring-shaped flange surrounding the gripper 11.

In the embodiment, the fixing portion 12 may not have a ring configuration. For example, the fixing portion 12 may be multiple fixing members having circular arc-like configurations. These fixing members may be arranged to be separated from each other at the periphery of the gripper 11 so that the hollow portion (the first space) of the gripper 11 is in an airtight state.

After the gripper 11 is in close contact with the workpiece, a hollow portion 13 interior (the first space) is depressurized. The gripper 11 deforms according to the shape of the workpiece. Because the fixing portion 12 holds the outer perimeter of the gripper 11, the gripper 11 can extend in the upward direction and deform to envelop the workpiece.

A granular material 14 is provided in the hollow portion 13 of the gripper 11. For example, the granular material 14 is filled into the hollow portion 13. The granular material 14 is jammed and solidified by the depressurizing of the hollow portion 13. The configuration of the gripper 11 is fixed in a configuration enveloping the workpiece.

When the gripper 11 is in close contact with the workpiece, one end of a through-hole 15 is sealed. Thereby, the interior of the through-hole 15 can be depressurized. The suction effect of the workpiece by the suction generates a gripping force.

For example, the entire perimeter of the gripper 11 is held by the ring-shaped fixing portion 12. Therefore, the gripping force on the workpiece is generated more uniformly in the circumferential direction. As described below, for example, by mounting the gripping tool 10 to the arm of the transfer robot, the workpiece can be gripped and transferred more stably.

Details of the gripping tool will now be described.

The gripper 11 includes a first portion 11a, a second portion 11b, a third portion 11c, and a fourth portion 11d. The second portion 11b surrounds the first portion 11a. The second portion 11b is separated from the first portion 11a. The third portion 11c is connected to one end of the first portion 11a and one end of the second portion 11b. The fourth portion 11d is connected to the other end of the first portion 11a and the other end of the second portion 11b. The gripper 11 can deform in a direction of a line connecting the third portion 11c and the fourth portion 11d. For example, the line direction includes the +Z direction illustrated in FIG. 1, and the −Z direction opposite to the +Z direction. The direction of the line connecting the third portion 11c and the fourth portion 11d crosses a direction of a line connecting the first portion 11a and the second portion 11b. For example, the direction of the line connecting the first portion 11a and the second portion 11b is parallel to an R-direction illustrated in FIG. 1.

The first space that is surrounded with the first portion 11a, the second portion 11b, the third portion 11c, and the fourth portion 11d is the hollow portion 13. The space that is surrounded with the first portion 11a is the through-hole 15. The hollow portion 13 is a closed space. The two sides of the through-hole 15 are open. A second port 17 is connected to one end of the through-hole 15. The other end of the through-hole 15 is sealed by the workpiece.

In the embodiment, the first portion 11a and the second portion 11b have circular tubular configurations. The third portion 11c is convex outward (the −Z direction) from the hollow portion 13. The fourth portion 11d has a substantially flattened configuration. The fourth portion 11d may be convex outward (the +Z direction) from the hollow portion 13.

The fourth portion 11d includes a first port 16 and the second port 17. The first port 16 is an exhaust port for depressurizing the interior of the hollow portion 13. The second port 17 is an exhaust port for depressurizing the interior of the through-hole 15. The first port 16 is positioned between the center and the outer perimeter of the fourth portion 11d. The second port 17 is positioned at the center of the fourth portion 11d.

A first pipe 18 is connected to the first port 16. A second pipe 19 is connected to the second port 17. The first pipe 18 and the second pipe 19 are, for example, flexible tubes made of a resin.

The gripper 11 includes a fifth portion 11e having a brim configuration. The fifth portion 11e extends toward the fixing portion 12 (in the drawing, the R-direction) from the connection portion of the second portion 11b and the fourth portion 11d. For example, the gripper 11 is held by the fixing portion 12 by the fifth portion 11e being clamped between the fixing portion 12.

The fixing portion 12 includes a first flange 12a and a second flange 12b having ring configurations. A notch, screws 20, through-holes, and counterbores are provided in the first flange 12a. The notch is provided on the inner perimeter side of the first flange 12a. The notch is shallower than the thickness of the fifth portion 11e. The headed screws 20 are provided on the outer perimeter side of the first flange 12a. For example, hexagonal bolts are inserted through the through-holes. The counterbores contain the heads of the screws 20. Multiple screw holes are provided in the second flange 12b at positions opposing the through-holes of the first flange 12a. The multiple screws 20 of the first flange 12a are screwed respectively into the multiple screw holes of the second flange 12b. For example, the screw holes pierce the second flange 12b. The screw holes may not pierce through the second flange 12b.

The fifth portion 11e is clamped between the second flange 12b and the notch of the first flange 12a. The first flange 12a and the second flange 12b are fastened by the screws 20 in this state. Thereby, the gripper 11 is held by the fixing portion 12 uniformly over the entire perimeter.

The gripper 11 is flexible and airtight. For example, the gripper 11 is formed of an acrylic resin. The gripper 11 may be formed of a silicone resin, rubber, etc. The granular material 14 is, for example, microbeads. The granular material 14 may be silicone resin beads, coffee beans, glass beads, etc. Any substance having a large surface friction can be used as the granular material 14.

FIGS. 3A to 3E are cross-sectional views showing the operation of the gripping tool 10. FIGS. 3A to 3E show an example in which a workpiece 30 having a disk configuration is gripped by the gripping tool 10. The configuration of the cross section of the workpiece 30 is three connected triangles. The size of the gripper 11 (the diameter of the tubular second portion 11b) is larger than the size of the workpiece 30. The gripper 11 opposes vertices of the triangles.

As shown in FIG. 3A, first, the position in the horizontal direction of the gripper 11 and the position in the horizontal direction of the workpiece 30 are aligned. The gripper 11 is lowered toward the workpiece 30.

The gripper 11 is flexible. Accordingly, as shown in FIG. 3B, the gripper 11 deforms when the gripper 11 contacts the workpiece 30. The gripper 11 is pressed outward along the oblique sides of the triangles of the outer perimeter of the workpiece 30. The gripper 11 is in close contact with the workpiece 30 to envelop the workpiece 30. One end of the through-hole 15 is sealed by the workpiece 30.

As shown in FIG. 3C, the lowering of the gripper 11 is stopped. The interior of the hollow portion 13 is suctioned. For example, the hollow portion 13 is depressurized to about 0.1 atmosphere. The granular material 14 inside the hollow portion 13 jams and solidifies. The configuration of the gripper 11 in close contact with the workpiece 30 to envelop the workpiece 30 is fixed. A force for gripping the workpiece 30 is generated thereby.

As shown in FIG. 3D, the interior of the through-hole 15 is suctioned and depressurized to, for example, about 0.1 atmosphere. The suction effect of the workpiece 30 increases the gripping force of the gripper 11.

As shown in FIG. 3E, the gripping tool 10 that grips the workpiece 30 is raised. By moving the gripping tool 10 in the horizontal direction, the workpiece 30 is transferred to another location.

Figure 4:
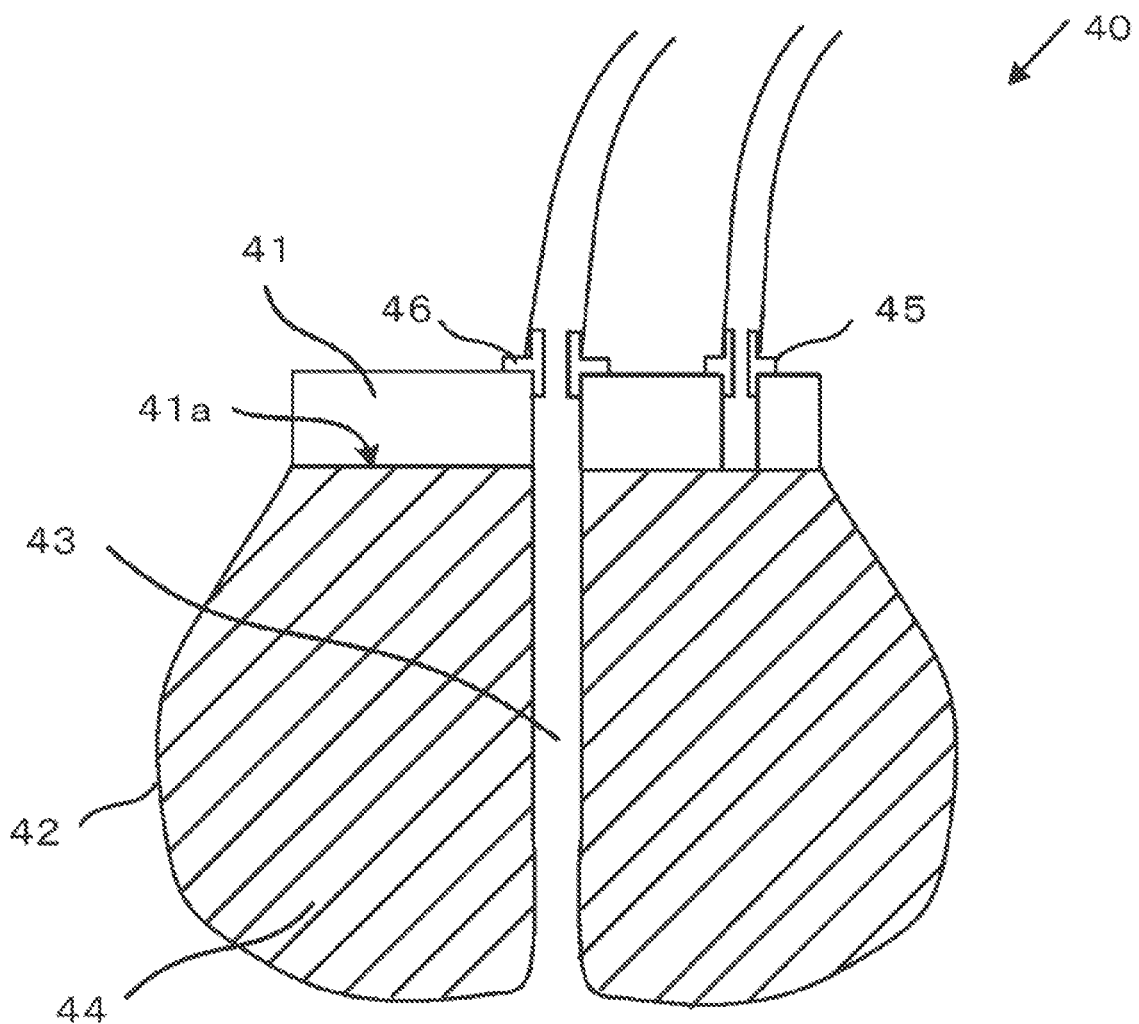
FIG. 4 is a cross-sectional view showing a gripping tool of a comparative example according to the first embodiment.

The gripping mechanism of the gripping tool 10 will now be described by comparing to the gripping mechanism of a gripping tool of a comparative example. FIG. 4 is a cross-sectional view showing the gripping tool of the comparative example. The fixing portion does not have a toroidal configuration in the gripping tool of the comparative example. In the gripping tool, the fixing portion holds the side of the gripper where the exhaust port is provided.

As shown in FIG. 4, the gripping tool 40 of the comparative example includes a fixing portion 41 and a hollow bag 42. A pressure supporting surface 41a is provided at one end of the fixing portion 41. The hollow bag 42 functions as the gripper. The hollow bag 42 is mounted to be in close contact with the pressure supporting surface 41a. A through-hole 43 is formed by being surrounded with the inner side surface of the hollow bag 42. A granular material 44 is filled into the hollow bag 42. A first port 45 and a second port 46 are provided in the fixing portion 41. The first port 45 functions as an exhaust port for depressurizing the interior of the hollow bag 42. The second port 46 functions as an exhaust port for depressurizing the interior of the through-hole 43.

Figure 5A:
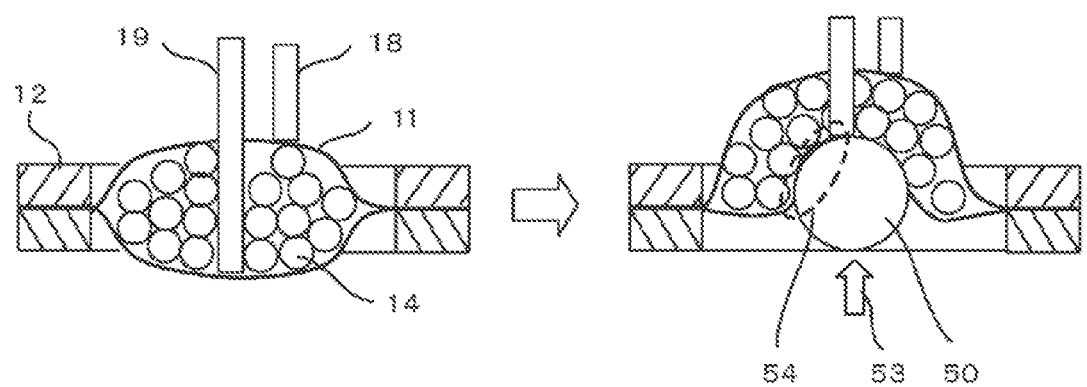
FIGS. 5A and 5B are cross-sectional views comparatively showing the gripping mechanism of the gripping tool of the first embodiment and the gripping mechanism of the gripping tool of the comparative example.
Figure 5B:
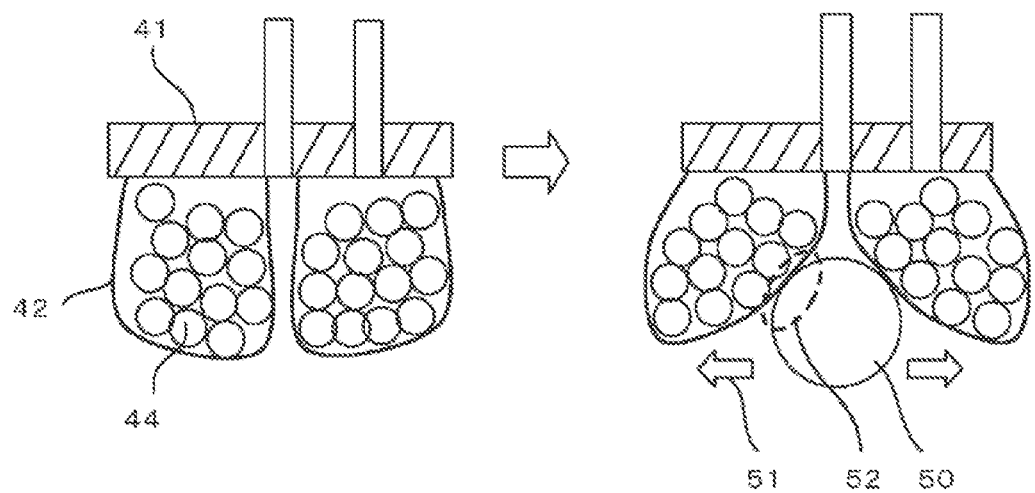

FIGS. 5A and 5B show the gripping mechanisms of the gripping tools. FIG. 5A shows the gripping mechanism of the gripping tool of the embodiment. FIG. 5B shows the gripping mechanism of the gripping tool of the comparative example. In these examples, the workpiece is a sphere. The diameter of the sphere is smaller than the inner diameter of the fixing portion 12 and the diameter of the fixing portion 41. First, the gripping mechanism of the gripping tool of the comparative example will be described.

In the gripping tool 40 of the comparative example as shown in FIG. 5B, the hollow bag 42 is mounted to be in close contact with the pressure supporting surface 41a of the fixing portion 41. The hollow bag 42 is lowered and caused to contact the workpiece 50. At this time, the hollow bag 42 deforms to widen in the lateral direction as shown by arrow 51. This is because the hollow bag 42 cannot extend upward.

As a result, the contact surface area of a contact portion 52 between the hollow bag 42 and the workpiece 50 is insufficiently large. The hollow bag 42 envelops the workpiece 50 shallowly. Accordingly, the gripping effect of gripping the workpiece is small when the granular material 44 inside the hollow bag 42 is solidified. There is also a possibility that the workpiece 50 may slip downward in the case where the airtightness of the through-hole 43 is not obtained sufficiently due to air leakage, etc.

On the other hand, for example, in the gripping tool 10 of the embodiment as shown in FIG. 5A, the gripper 11 is lowered; and the gripper 11 extends (deforms) in the upward direction as shown by arrow 53 when the gripper 11 contacts the workpiece 50. The gripper 11 does not widen easily in the lateral direction because the outer perimeter of the gripper 11 is held by the fixing portion 12.

As a result, the contact surface area of a contact portion 54 between the gripper 11 and the workpiece 50 is large. The gripper 11 can envelop the workpiece 50 deeply. Accordingly, a sufficient gripping effect is obtained.

Figure 6:
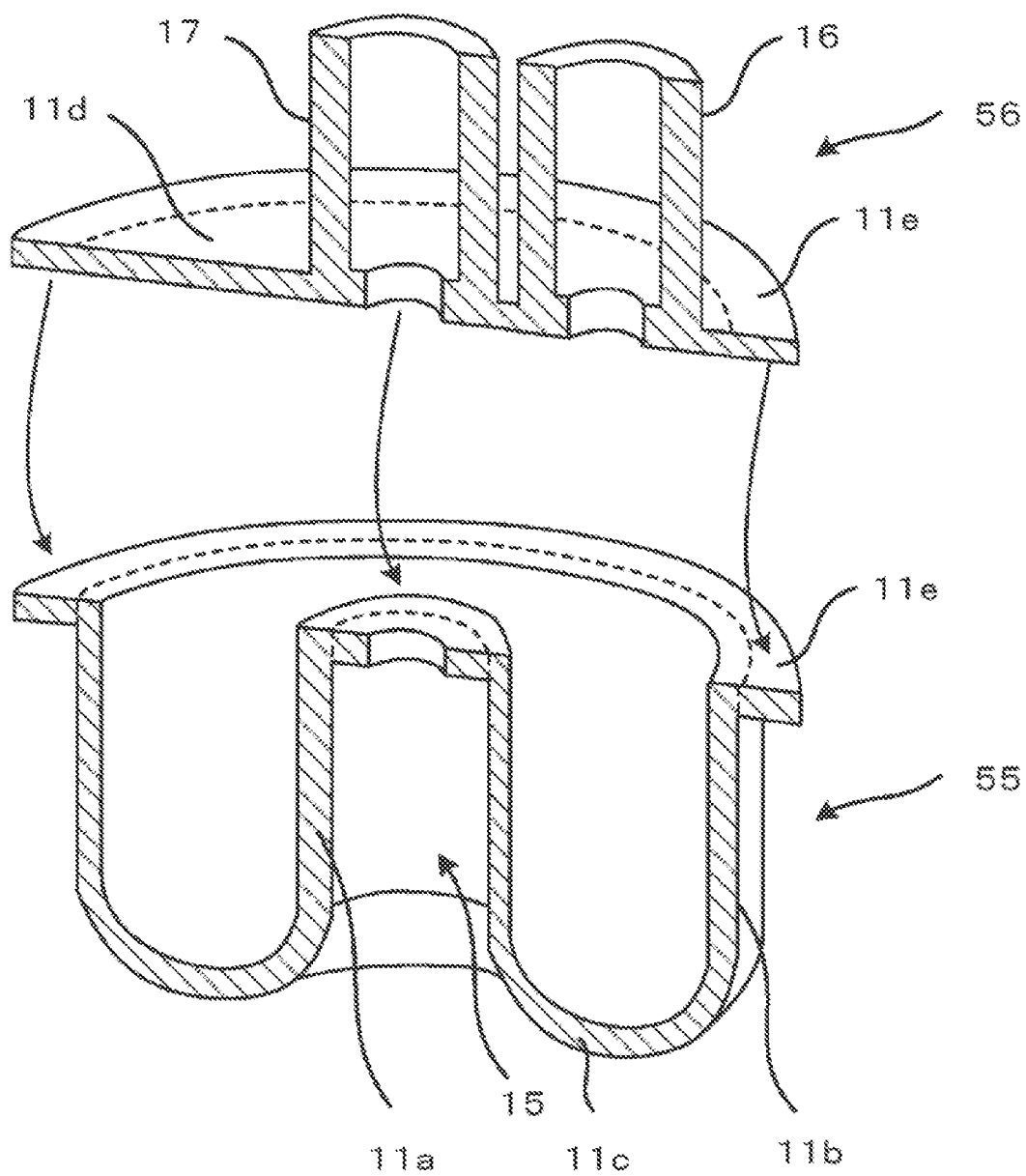
FIG. 6 is a cross-sectional perspective view showing a method for forming the gripping tool according to the first embodiment.

For example, the gripper 11 is formed as follows. FIG. 6 is a cross-sectional perspective view showing the method for forming the gripper 11.

As shown in FIG. 6, a first molded body 55 is formed using a first mold (not illustrated). The first molded body 55 includes the first portion 11a, the second portion 11b, the third portion 11c, and a portion of the fifth portion 11e. The portion of the fifth portion 11e recited above extends from the second portion 11b. A second molded body 56 is formed using a second mold (not illustrated). The second molded body 56 includes the fourth portion 11d and another portion of the fifth portion 11e. The fourth portion 11d includes the first port 16 and the second port 17. The other portion of the fifth portion 11e extends from the fourth portion 11d.

The first molded body 55 and the second molded body 56 are bonded using a bonding agent. The gripper 11 is obtained thereby. The first molded body 55 and the second molded body 56 may be bonded using thermal compression bonding.

As described above, the gripping tool 10 of the embodiment includes the gripper 11 and the fixing portion 12. The gripper 11 has a torus configuration. The fixing portion 12 surrounds the gripper 11. The fixing portion 12 holds the entire perimeter of the gripper 11. As a result, the gripper 11 can deform in the upward direction when contacting the workpiece. Accordingly, the gripper 11 can envelop the workpiece deeply. A sufficient gripping effect is obtained. For an equivalent amount of the granular material, a gripping force that is larger than the conventional gripping force can be obtained in the embodiment.

The suction effect of the workpiece is obtained also by depressurizing the interior of the through-hole 15 in the state in which one end of the through-hole 15 is sealed with the workpiece. The gripping force can be improved further.

A case is described in the example described above in which the first portion 11a and the second portion 11b have circular tubular configurations. The configurations of the tubes are not particularly limited; and it is sufficient that the hollow portion 13 and the through-hole 15 can be obtained. For example, the first portion 11a and the second portion 11b may have polygonal tubular configurations. From the perspective of the uniformity of the close adhesion to the workpiece, it is favorable for the first portion 11a and the second portion 11b to have circular tubular configurations.

Figure 7:
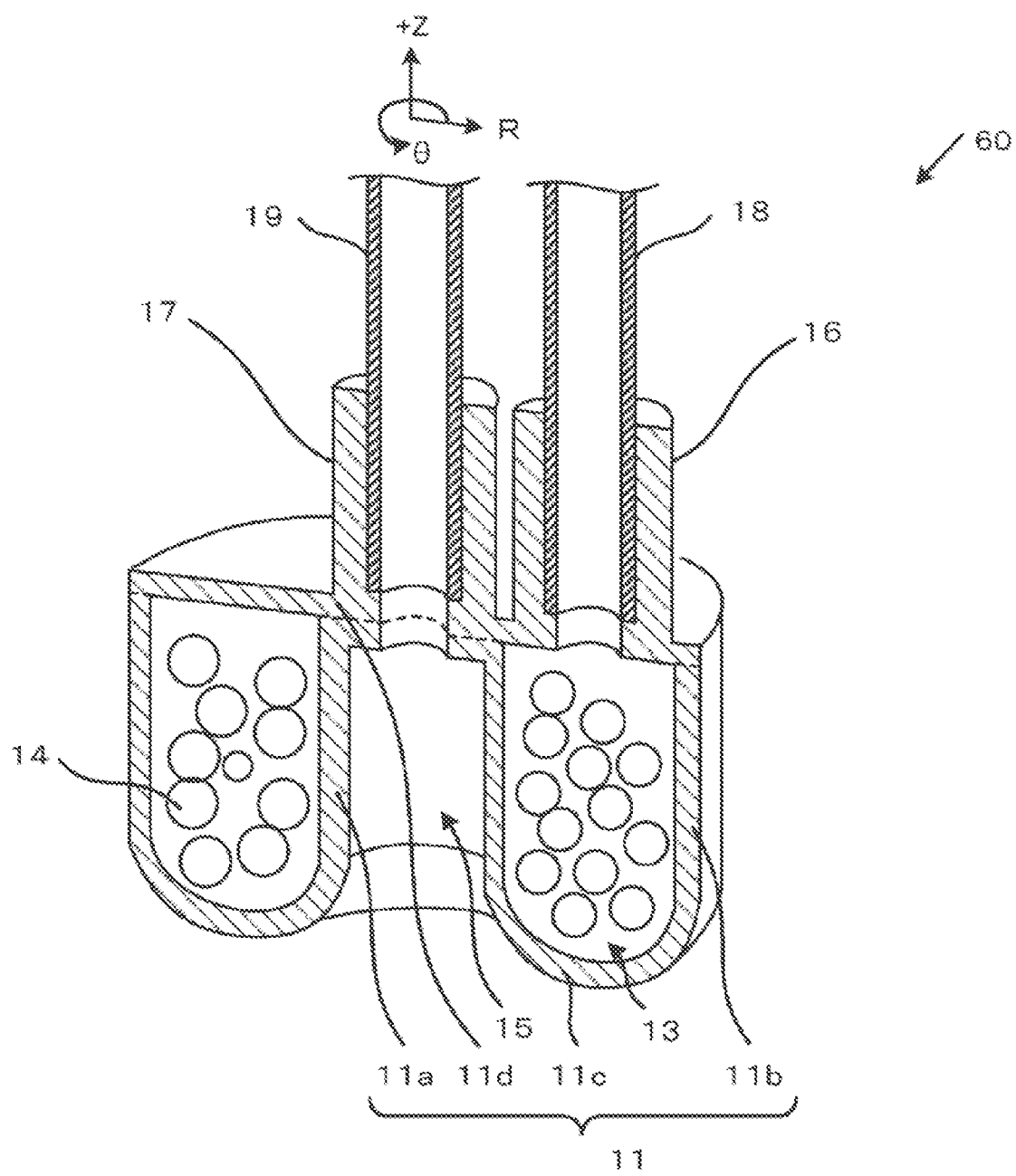
FIG. 7 is a cross-sectional perspective view showing another gripping tool according to the first embodiment.

The gripping tool 10 can grip the workpiece even in the case where the gripping tool 10 does not include the fixing portion 12. FIG. 7 is a cross-sectional perspective view showing a gripping tool that does not include a fixing portion. As shown in FIG. 7, the gripping tool 60 does not include the fixing portion 12. Other than the fixing portion 12, the components of the gripping tool 60 are similar to those of the gripping tool 10 shown in FIG. 1; and a description is omitted. The gripping force of the gripping tool 60 is equal to the gripping force of the gripping tool 10.

The brim-shaped fifth portion 11e may not be provided. However, it is favorable to use the brim-shaped fifth portion 11e as a glue tab when bonding the first molded body and the second molded body when forming the gripping tool 60.

Second Embodiment

Figure 8:
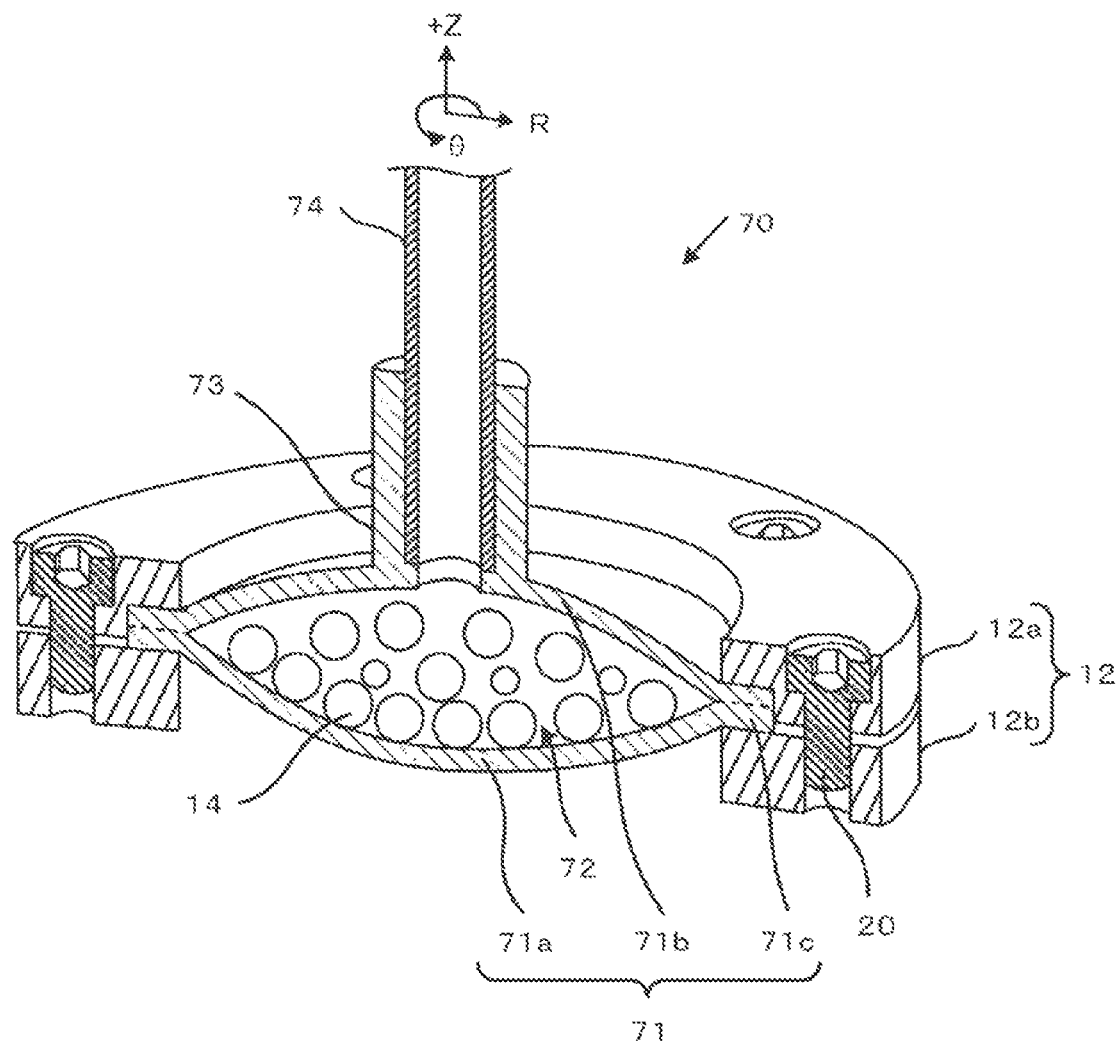
FIG. 8 is a cross-sectional perspective view showing a gripping tool according to a second embodiment.
Figure 9A:
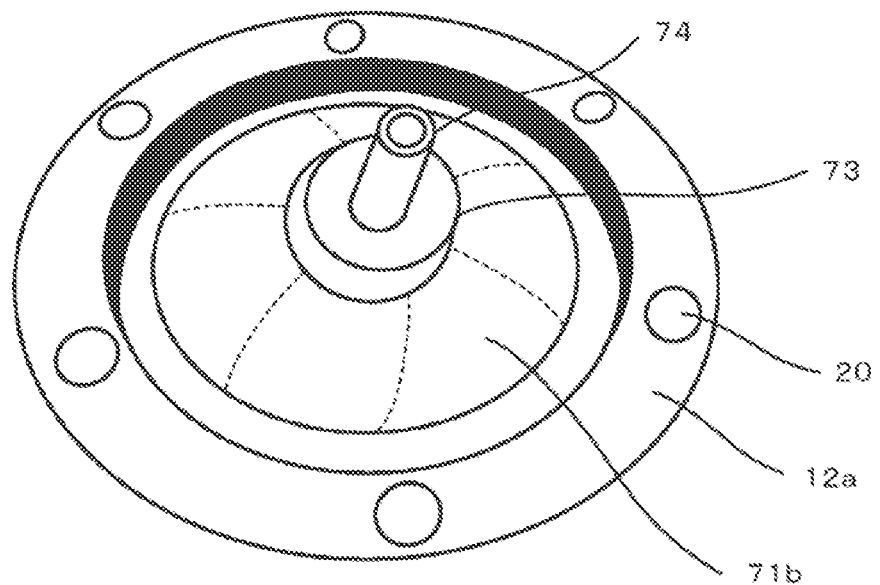
FIGS. 9A and 9B are perspective views showing the gripping tool according to the second embodiment.
Figure 9B:
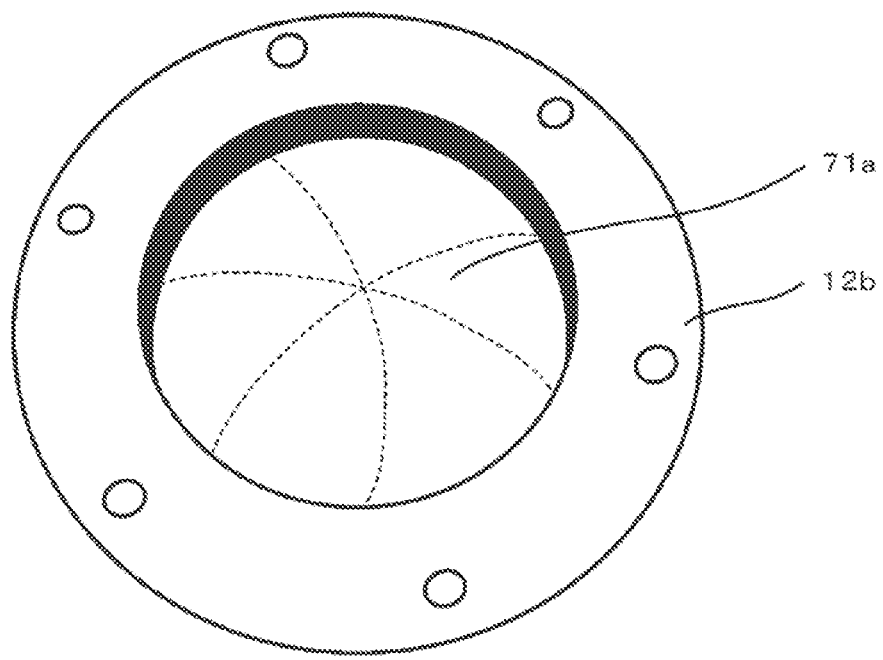

A gripping tool according to the embodiment will now be described using FIG. 8 to FIG. 9B. FIG. 8 is a cross-sectional perspective view showing the gripping tool of the embodiment. FIGS. 9A and 9B are perspective views showing the gripping tool. FIG. 9A is a perspective view in which the gripping tool is viewed from obliquely upward. FIG. 9B is a perspective view in which the gripping tool is viewed from obliquely downward.

In the embodiment, a description is omitted for configurations similar to those of the first embodiment; and different aspects are described. Compared to the first embodiment, the concave portion and the through-hole are not provided at the center of the gripper in the embodiment.

In other words, as shown in FIG. 8 to FIG. 9B, the gripping tool 70 of the embodiment includes a gripper 71 for gripping the workpiece (not illustrated), and the fixing portion 12 for holding the gripper 71. The exterior form of the gripper 71 has a biconvex lens configuration. The interior of the gripper 71 is hollow.

When the gripper 71 is in close contact with the workpiece, the interior of a hollow portion 72 is depressurized; and the gripper 71 deforms according to the portion in close contact with the workpiece. The gripper 71 is flexible and pliable. Therefore, the gripper 71 can deform to envelop the workpiece.

The granular material 14 is provided in the hollow portion 72 of the gripper 71. The granular material 14 jams and solidifies due to the depressurization. Therefore, the gripper 71 is fixed in a configuration enveloping the workpiece.

The entire outer perimeter of the gripper 71 is held by the fixing portion 12. Therefore, the workpiece can be gripped uniformly. As described below, by mounting the gripping tool 70 to the arm of a transfer robot, the workpiece can be gripped and transferred uniformly.

Specifically, the gripper 71 includes a first portion 71a and a second portion 71b. The first portion 71a has a convex first curved surface. The second portion 71b has a convex second curved surface. The first portion 71a and the second portion 71b are overlaid so that the first curved surface and the second curved surface oppose each other. The space that is surrounded with the first portion 71a and the second portion 71b is the hollow portion 72. The hollow portion 72 is a closed space. The gripper 71 includes a port 73. The port 73 is provided at the center of the second portion 71b. The port 73 functions as an exhaust port for depressurizing the interior of the hollow portion 72. A pipe 74 is connected to the port 73.

The gripper 71 further includes a brim-shaped third portion 71c extending toward the fixing portion 12 (in the drawing, the R-direction) from the first portion 71a and the second portion 71b. The brim-shaped third portion 71c is provided for the fixing portion 12 to hold the gripper 11.

The first flange 12a and the second flange 12b of the fixing portion 12 clamp the brim-shaped third portion 71c between the notch of the first flange 12a and the second flange 12b. The first flange 12a and the second flange 12b are fastened by the screws 20. Thereby, the gripper 71 is held by the fixing portion 12 uniformly over the entire outer perimeter.

Figure 10:
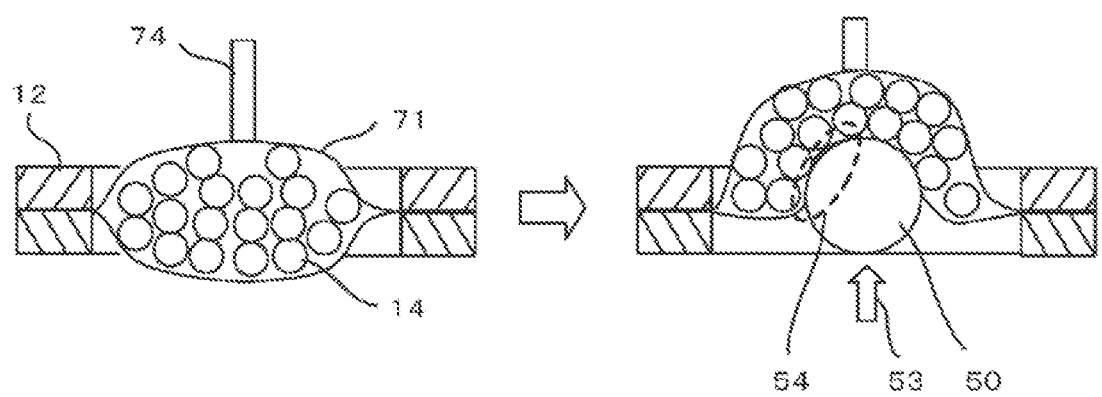
FIG. 10 is a cross-sectional view showing a gripping mechanism of the gripping tool according to the second embodiment.

FIG. 10 is a cross-sectional view showing the gripping mechanism of the gripping tool 70. As shown in FIG. 10, the gripping mechanism of the gripping tool 70 is substantially the same as the gripping mechanism of the gripping tool 10 shown in FIG. 5A. The gripper 71 differs in that the gripper 71 does not have a through-hole. Therefore, the suction effect of the workpiece by suctioning the interior of the through-hole is not obtained.

As described above, the exterior form of the gripping tool 70 of the embodiment has a biconvex lens configuration. The gripping tool 70 includes the gripper 71 having a hollow interior, and the fixing portion 12 for holding the gripper 71. Other than the suction effect of the workpiece 50 not being obtained, the gripping tool 70 obtains effects similar to those of the gripping tool 10 shown in FIG. 1.

Figure 11:
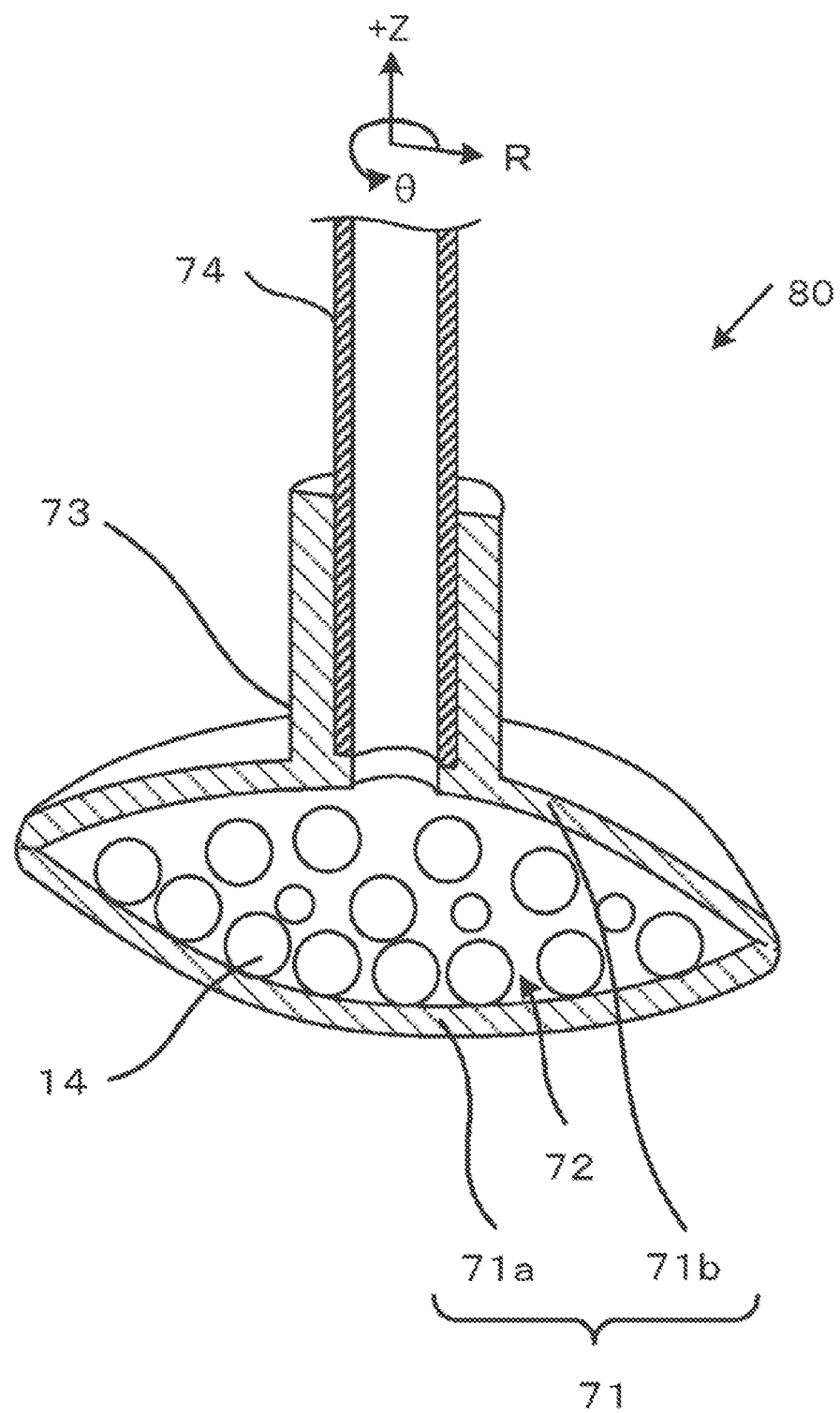
FIG. 11 is a cross-sectional perspective view showing another gripping tool according to the second embodiment.

The gripping tool 70 may not include the fixing portion 12. In such a case as well, the gripping tool 70 can grip the workpiece. FIG. 11 is a cross-sectional perspective view showing a gripping tool that does not include a fixing portion. As shown in FIG. 11, other than not including the fixing portion 12, the gripping tool 80 is similar to the gripping tool 70 shown in FIG. 7; and a description is omitted. The gripping force of the gripping tool 80 is equal to the gripping force of the gripping tool 70.

The brim-shaped third portion 71c may not be provided. However, it is favorable to use the brim-shaped third portion 71c as a glue tab when bonding the first molded body and the second molded body when forming the gripping tool 80.

Third Embodiment

Figure 12:
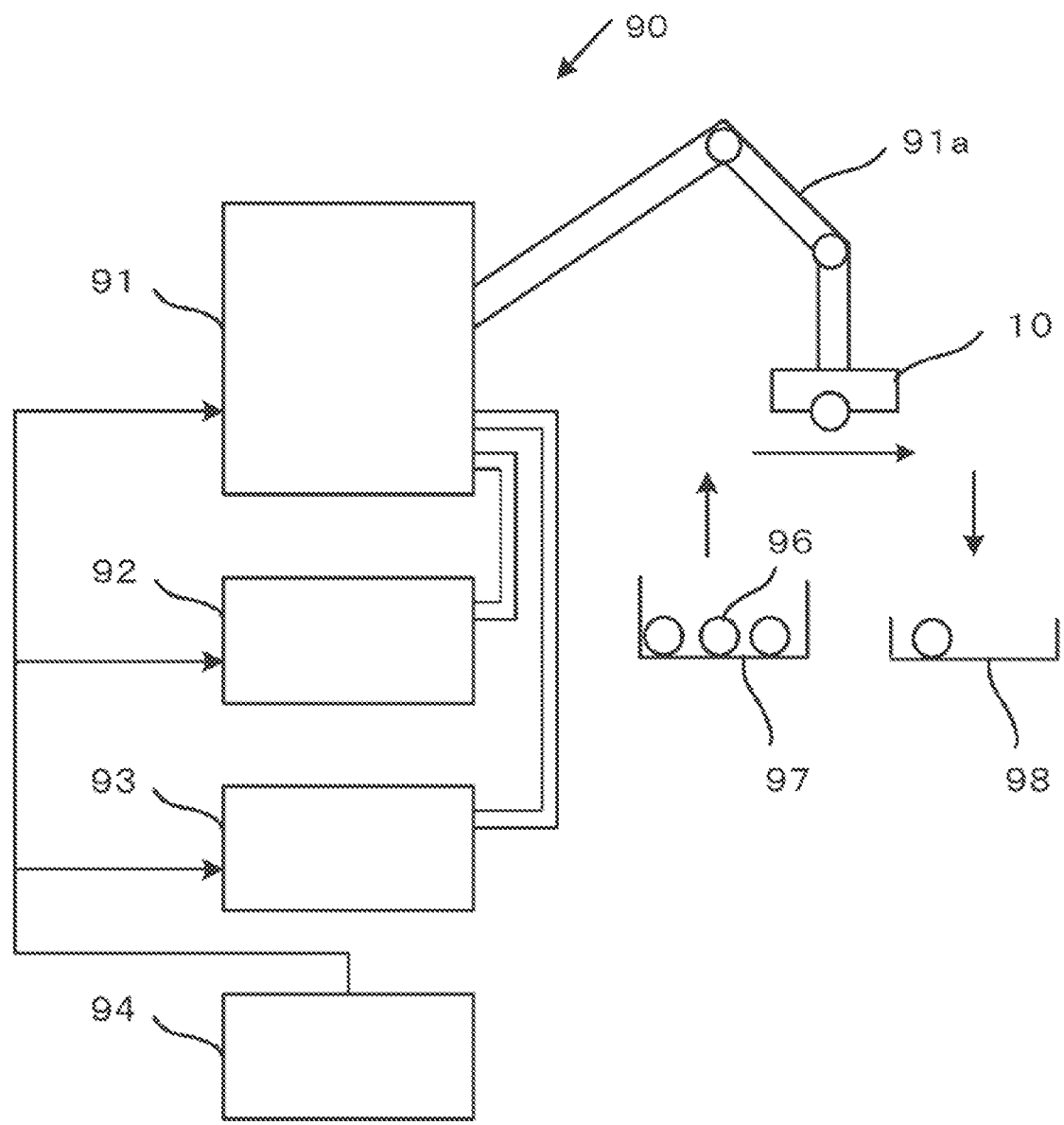
FIG. 12 is a block diagram showing a gripping system according to a third embodiment.
Figure 13:
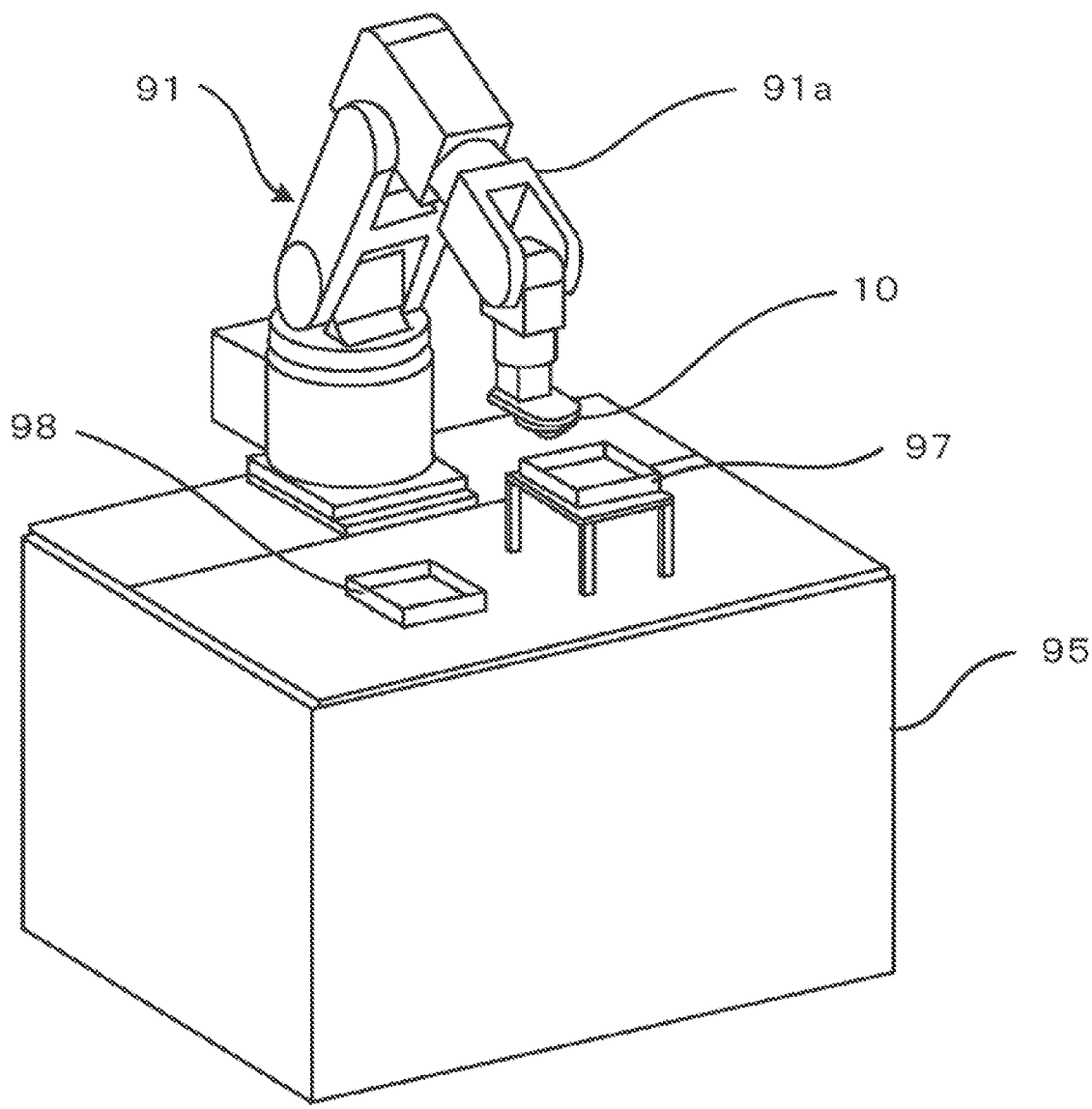
FIG. 13 is an exterior view of the gripping system according to the third embodiment.
Figure 14:
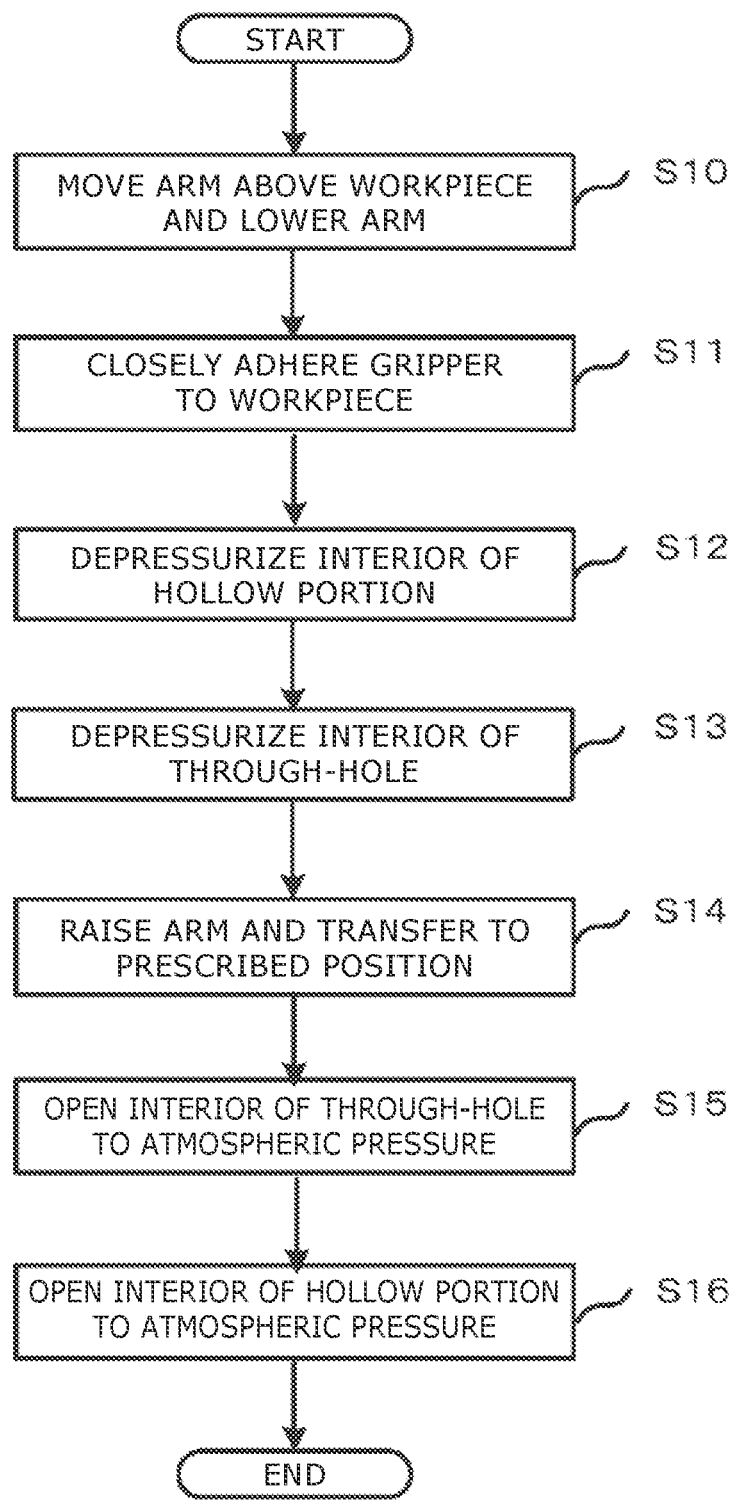
FIG. 14 is a flow chart showing the operation of the gripping system according to the third embodiment.

A gripping system according to the embodiment will now be described using FIG. 12 to FIG. 14. For example, the gripping tools of the first and second embodiments described above can be used in the embodiment. FIG. 12 is a block diagram showing the gripping system of the embodiment. FIG. 13 is an exterior view of the gripping system. FIG. 14 is a flowchart showing the operation of the gripping system.

The gripping system 90 of the embodiment includes a transfer robot 91, the gripping tool 10, a first depressurizing apparatus 92, a second depressurizing apparatus 93, and a controller 94. The transfer robot 91 includes an arm 91a. The transfer robot 91 transfers the workpiece at the pickup position to the prescribed location. The gripping tool 10 is mounted to the tip of the arm 91a. The first depressurizing apparatus 92 is used to depressurize the interior of the hollow portion 13 to a first prescribed pressure. The second depressurizing apparatus 93 is used to depressurize the interior of the through-hole 15 to a second prescribed pressure. The controller 94 sends commands for controlling the transfer robot 91, the first depressurizing apparatus 92, and the second depressurizing apparatus 93.

In the embodiment described above, the gripping tool 10 also can grip the workpiece by depressurizing the interior of the hollow portion 13 to the first prescribed pressure without depressurizing the interior of the through-hole 15. Accordingly, in the form of the embodiment, the gripping system 90 may not include the second depressurizing apparatus 93. In such a case, the controller 94 sends the commands for controlling the transfer robot 91 and the first depressurizing apparatus 92.

As shown in FIG. 12 and FIG. 13, the gripping system 90 of the embodiment includes the transfer robot 91, the gripping tool 10, the first depressurizing apparatus 92, the second depressurizing apparatus 93, and the controller 94. The transfer robot 91 includes the arm 91a. The transfer robot 91 transfers the workpiece at the pickup position to the prescribed location. The gripping tool 10 is mounted to the tip of the arm 91a. The first depressurizing apparatus 92 is used to depressurize the interior of the hollow portion 13 to the first prescribed pressure. The second depressurizing apparatus 93 is used to depressurize the interior of the through-hole 15 to the second prescribed pressure. The controller 94 sends the commands for controlling the transfer robot 91, the first depressurizing apparatus 92, and the second depressurizing apparatus 93.

The transfer robot 91 is an articulated robot. The transfer robot 91 operates the arm 91a according to the commands from the controller 94 and transfers the gripped workpiece. The transfer robot 91 may include an image processing system for recognizing the workpiece.

The transfer robot 91 is installed on the table of a stand 95. The first depressurizing apparatus 92, the second depressurizing apparatus 93, and the controller 94 are stored within the stand 95. A tray 97 and a tray 98 are disposed on the table of the stand 95. The tray 97 stores a workpiece 96 at the pickup position. The tray 98 stores the transferred workpiece 96.

The first depressurizing apparatus 92 includes a vacuum pump, e.g., a rotary pump, a vacuum valve, a leak valve for opening to atmospheric pressure, etc. According to a command from the controller 94, the first depressurizing apparatus 92 closes the leak valve, opens the vacuum valve, and turns the vacuum pump ON. Thereby, a vacuum is drawn in the hollow portion 13 interior. According to a command from the controller 94, the first depressurizing apparatus 92 opens the hollow portion 13 interior to atmospheric pressure by turning the vacuum pump OFF and opening the leak valve. The second depressurizing apparatus 93 is similar to the first depressurizing apparatus 92; and a description is omitted.

The controller 94 includes a Central Processing Unit (CPU), an input/output interface between the transfer robot 91, the first depressurizing apparatus 92, and the second depressurizing apparatus 93, read only memory (ROM), random access memory (RAM), nonvolatile NAND flash memory, etc. The CPU performs various processing. The ROM stores control algorithms, various constants, etc. The RAM functions as a work region. The flash memory appropriately stores transfer procedures, transfer conditions, and the like of the workpiece 96.

The controller 94 controls the transfer robot 91, the first depressurizing apparatus 92, and the second depressurizing apparatus 93. The controller 94 sends the commands to the transfer robot 91, the first depressurizing apparatus 92, and the second depressurizing apparatus 93 according to a transfer procedure stored in NAND flash memory, FIG. 14 is a flowchart showing the operation of the gripping system 90.

The controller 94 sends a command to the transfer robot 91. Based on the command, the arm 91a moves above the workpiece 96 stored in the tray 97. The arm 91a is lowered (step S10).

The controller 94 sends a command to the transfer robot 91. Based on the command, the transfer robot 91 lowers the arm 91a a prescribed distance further from the position where the arm 91a contacts the workpiece 96. The transfer robot 91 stops the lowering of the arm 91a when the gripper 11 is in close contact with the workpiece 96 (step S11).

The controller 94 sends a command to the first depressurizing apparatus 92. Based on the command, the first depressurizing apparatus 92 depressurizes the interior of the hollow portion 13 to the first pressure, e.g., about 0.1 atmosphere. Thereby, the granular material 14 is solidified; and a gripping force is generated (step S12).

The controller 94 sends a command to the second depressurizing apparatus 93. Based on the command, the second depressurizing apparatus 93 depressurizes the interior of the through-hole 15 to the second pressure, e.g., about 0.1 atmosphere. Thereby, the suction effect of the workpiece is added; and the gripping force increases (step S13).

The controller 94 sends a command to the transfer robot 91. Based on the command, the transfer robot 91 raises the arm 91a and transfers the gripped workpiece 96 to the prescribed position (step S14).

The controller 94 sends a command to the second depressurizing apparatus 93. Based on the command, the second depressurizing apparatus 93 opens the interior of the through-hole 15 to atmospheric pressure. Continuing, the controller 94 sends a command to the first depressurizing apparatus 92. Based on the command, the first depressurizing apparatus 92 opens the interior of the hollow portion 13 to atmospheric pressure. Thereby, the gripping force is eliminated; and the workpiece 96 is separated from the gripper 11 and stored in the tray 98 (steps S15 and S16).

In the gripping system 90 of the embodiment as described above, the gripping tool 10 is mounted to the arm 91a of the transfer robot 91. Therefore, the workpiece can be transferred by a sufficient gripping force.

The case is described in the example described above where step S13 of depressurizing the interior of the through-hole 15 is performed after step S12 of depressurizing the interior of the hollow portion 13. Step S12 and step S13 may be performed simultaneously. Step S12 may be performed after step S13.

This is similar for step S15 of opening the interior of the through-hole 15 to atmospheric pressure and step S16 of opening the interior of the hollow portion 13 to atmospheric pressure; and a description is omitted.

The case is described in the example described above where the gripping tool 10 is mounted to the arm 91a of the transfer robot 91. The gripping tool 70 shown in FIG. 8 may be mounted to the arm 91a. The gripping tool 60 shown in FIG. 7 or the gripping tool 80 shown in FIG. 11 may be mounted to the arm 91a. In such a case, for example, it is favorable for the tip of the pipe to be a metal pipe, a hard resin pipe, etc., and for the vicinity of the connection portion between the port and the pipe to be fixed to the arm 91a.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A gripping tool, comprising a gripper,
   the gripper including
      a first flexible part configured to contact a workpiece, and
      a second flexible part,
   the second flexible part including
      a contact region contacting the first flexible part, and
      a non-contact region being away from the first flexible part,
   a granular material being provided in an interior of the gripper and positioned between the first flexible part and the non-contact region,
   when viewed from a line direction connecting the first flexible part and the second flexible part, the non-contact region is positioned around the contact region in a state where the first flexible part does not contact the workpiece.

2. A gripping tool, comprising a gripper,
   the gripper being flexible and configured to grip a workpiece,
   the gripper including, in a state where the gripper does not contact the workpiece,
      a first portion having a circular tubular configuration,
      a second portion having a circular tubular configuration, surrounding the first portion and being away from the first portion,
      a third portion connected to one end of the first portion and one end of the second portion, and
      a fourth portion being away from the third portion and connected to another end of the first portion and another end of the second portion, a direction from the first portion toward the second portion crossing a direction from the third portion toward the fourth portion, a granular material being provided in a first space surrounded with the first portion, the second portion, the third portion, and the fourth portion, and
the gripper being configured to grip the workpiece by being in close contact with the workpiece and by the first space being depressurized.

3. The tool according to claim 2, wherein
in a state in which the gripper is in close contact with the workpiece, a second space surrounded with the first portion is depressurized.

4. The tool according to claim 3, wherein
a first port is provided in the fourth portion, and
a pipe is connected to the first port and configured to depressurize the first space.

5. The tool according to claim 4, wherein
a second port is provided in the fourth portion, and
a pipe is connected to the second port and configured to depressurize the second space.

6. The tool according to claim 3, further comprising a fixing portion holding an outer perimeter of the gripper, wherein
the gripper includes a fifth portion extending toward the fixing portion from the second portion and the fourth portion, and
the fifth portion is held by the fixing portion.

7. The tool according to claim 3, wherein in the state in which the gripper is in close contact with the workpiece, one end of the second space is sealed by the workpiece, and the second space is depressurized via another end of the second space.

8. A gripping tool, comprising:
a gripper, the gripper being flexible; and
the gripper including
a first portion having a first curved surface, the first curved surface being convex and being configured to contact a workpiece, and
a second portion having a second curved surface and overlapping the first portion to cause the first curved surface and the second curved surface to oppose each other, the second curved surface being convex,
a granular material being provided in a first space surrounded with the first and second portions,
the gripper being configured to grip the workpiece by being in close contact with the workpiece and by the first space being depressurized, and
when the gripper grips the workpiece, the second portion is more deformable in a direction from the first portion toward the second portion than an outer perimeter of the first portion and an outer perimeter of the second portion.

9. The tool according to claim 8, wherein
a port is provided in the second portion, and
a pipe is connected to the port and configured to depressurize the first space.

10. The tool according to claim 8, further comprising a fixing portion holding an outer perimeter of the gripper, wherein
the gripper includes a third portion having a brim configuration and extending toward the fixing portion from the first portion and the second portion, and
the third portion is held by the fixing portion.

11. A gripping tool, comprising a gripper,
the gripper being flexible and airtight and including a first portion, a second portion, a third portion, and a fourth portion,
the second portion surrounding the first portion and being away from the first portion,
the third portion being connected to one end of the first portion and one end of the second portion,
the fourth portion being away from the third portion and being connected to another end of the first portion and another end of the second portion,
a direction from the first portion toward the second portion crossing a direction from the third portion toward the fourth portion,
a granular material being filled into a hollow portion surrounded with the first to fourth portions, and
the gripper being configured to grip a workpiece by being in close contact with the workpiece and by an interior of the hollow portion being depressurized,
when the gripper grips the workpiece, the other end of the first portion connected to the fourth portion is more deformable in a direction from the third portion toward the fourth portion than is the other end of the second portion connected to the fourth portion.

12. The tool according to claim 11, wherein
the first portion is concave, and
a second space surrounded with the first portion is depressurized in a state in which the gripper is in close contact with the workpiece.

13. The tool according to claim 12, wherein
the first portion and the second portion have tubular configurations,
the third portion is convex,
a first port is provided in the fourth portion, and
a pipe is connected to the first port and configured to depressurize the first space.

14. The tool according to claim 13, wherein
a second port is provided in the fourth portion, and
a pipe is connected to the second port and configured to depressurize the second space.

15. The tool according to claim 12, wherein
in the state in which the gripper is in close contact with the workpiece, one end of the second space is sealed by the workpiece, and the second space is depressurized via another end of the second space.

16. A gripping system, comprising:
a robot mechanism including an arm;
the tool according to claim 1 mounted to a tip of the arm;
a first depressurizing apparatus configured to depressurize the interior of the gripper to a first pressure, the first pressure being prescribed; and
a controller controlling the robot mechanism and the first depressurizing apparatus.

17. A gripping system, comprising:
a robot mechanism including an arm;
the tool according to claim 11 mounted to a tip of the arm;
a first depressurizing apparatus configured to depressurize the interior of the gripper to a first pressure, the first pressure being prescribed; and
a controller controlling the robot mechanism and the first depressurizing apparatus.

18. A gripping system, comprising:
a robot mechanism including an arm;
the tool according to claim 3 mounted to a tip of the arm;
a first depressurizing apparatus configured to depressurize the first space to a first pressure, the first pressure being prescribed;
a second depressurizing apparatus configured to depressurize the second space to a second pressure, the second pressure being prescribed; and
a controller controlling the robot mechanism, the first depressurizing apparatus, and the second depressurizing apparatus.

19. A gripping system, comprising:
a robot mechanism including an arm;
the tool according to claim 12 mounted to a tip of the arm;
a first depressurizing apparatus configured to depressurize the first space to a first pressure, the first pressure being prescribed;
a second depressurizing apparatus configured to depressurize the second space to a second pressure, the second pressure being prescribed; and
a controller controlling the robot mechanism, the first depressurizing apparatus, and the second depressurizing apparatus.

* * * * *